July 22, 1924.

C. HARTER

DOORSTOP FOR END DOOR AUTOMOBILE FREIGHT CARS

Filed Oct. 3, 1921

Inventor
Charles Harter
Langdon Moore
Attorney

Patented July 22, 1924.

1,502,307

UNITED STATES PATENT OFFICE.

CHARLES HARTER, OF ST. LOUIS, MISSOURI.

DOORSTOP FOR END-DOOR AUTOMOBILE FREIGHT CARS.

Application filed October 3, 1921. Serial No. 504,865.

*To all whom it may concern:*

Be it known that I, CHARLES HARTER, a citizen of the United States, residing at St. Louis and State of Missouri, have invented new and useful Improvements in Doorstops for End-Door Automobile Freight Cars, of which the following is a specification.

This invention relates to improvements in freight car doors and more particularly to door stop for end door automobile freight cars.

One type of freight cars particularly adapted for the transportation of automobiles is provided with doors at the end of the car which are hinged to the end posts or car body near the sides of the car and which when closed meet at the center to completely close the end and which may be rotated about their hinges to completely uncover the end of the car for the reception or discharge of automobiles. It is an object of this invention to provide an inexpensive and simple stop to be used between the doors and end posts or car sides which will limit the outward opening of the doors and stop the movement before they swing out beyond the plane of the car sides and thereby prevent cars on the adjacent tracks from being sideswiped. It is another object of this invention to provide the stops with means for holding the doors in parallel relation to the car side after contacting with the stops and prevent their closing movement after such contact and it is a still further object to so construct the holding means upon the stops that they may be easily and readily operated to release the doors and allow them to be closed.

While the preferred form of this invention is illustrated upon the accompanying sheets of drawings, yet it is to be understood that minor detail changes may be made without departing from the scope thereof.

In the car end illustrated 1 is the end sill, 2 the roof, and 3—3 the portion of the end secured to the vertical end framing of the end 4—4 are end doors mounted to swing on hinges 5 carried on the end portions 3 and are provided with locking bolts 6 for securing the doors in closed position.

Figure 1:
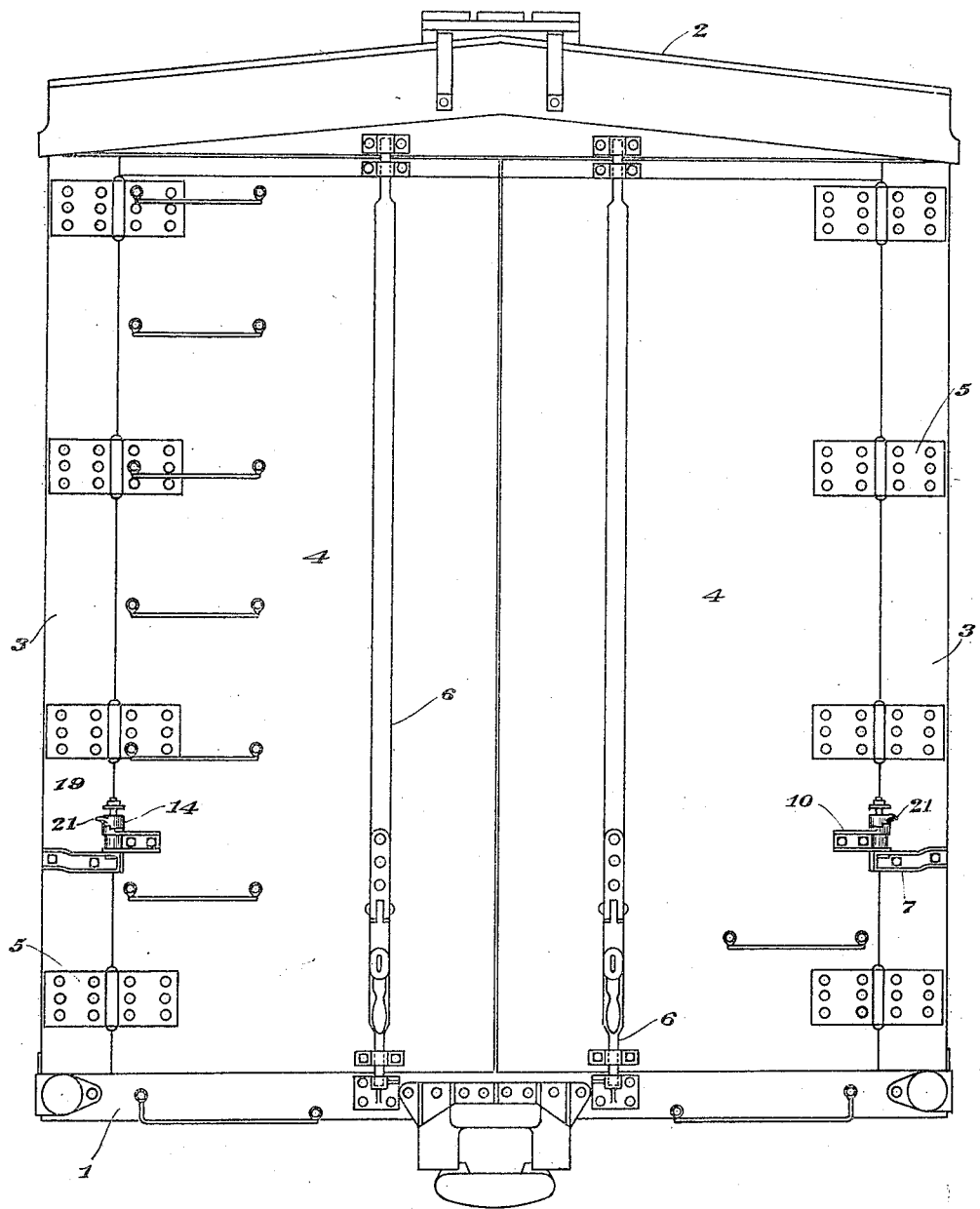
Fig. 1 is a view in end elevation of an ordinary form of end door automobile car illustrating this improved door stop in place.
Figure 2:
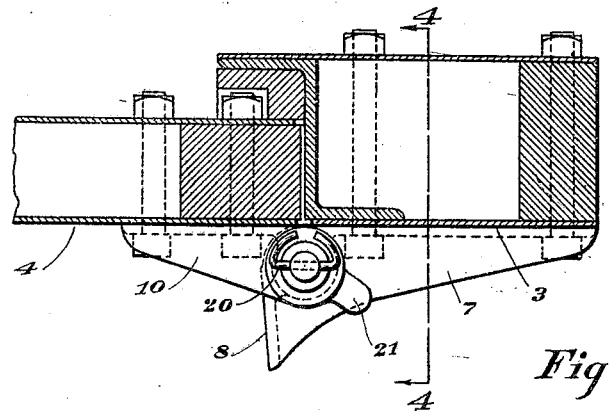
Fig. 2 is an enlarged detail top plan view of the door stop in place with parts of the door and car frame in section.
Figure 3:
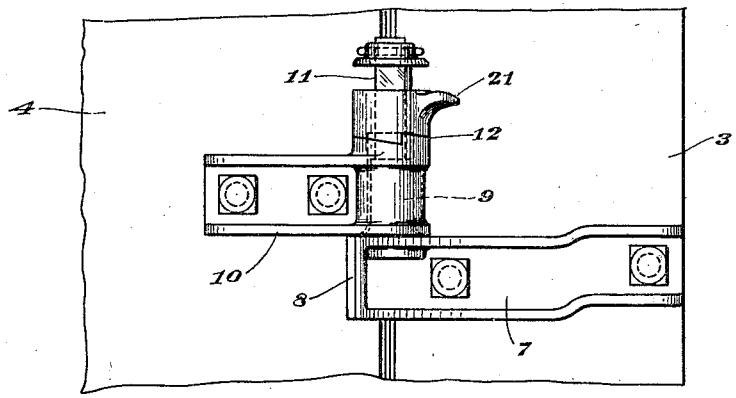
Fig. 3 is an enlarged detail view in end elevation of Fig. 1 with the door and car parts broken away.
Figure 4:
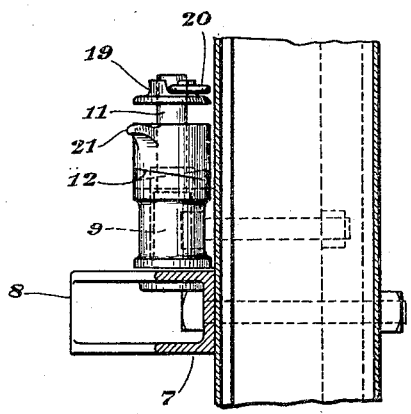
Fig. 4 is an enlarged detail view in side elevation of Fig. 3, partly in section taken on the line 4—4 of Fig. 2.
Figure 5:
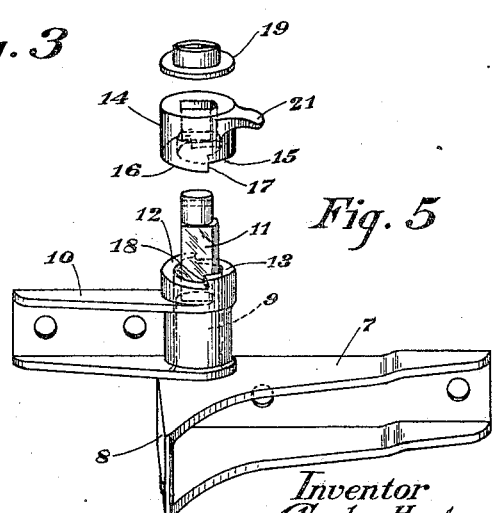
Fig. 5 is a perspective view of the parts forming this stop.

This improved door stop comprises a plate or casting 7 secured to the end portions 3 and having a shoulder 8 to engage the door when being opened and prevent it passing beyond the plane of the car sides. This plate or casting supports a hinge pin 9 in the axis of the pins of the door hinges 5 upon which is pivoted a second plate or casting 10 secured upon the door 4. The portion 11 of the pin 9 above the second plate or casting 10 is squared or reduced in diameter with a spline on one side. The top of the second plate or casting 10 surrounding the hinge pin 9 is inclined in two spiral planes, the spiral surfaces 12 and 13 terminating diametrically opposite each other with one end of one convolution ending above the other end and the other ending of the same convolution below the other, as clearly shown in Fig. 5.

A sleeve 14 is mounted to slide vertically upon the pin 9 and held from rotating by the formation of the reduced portion 11 thereon. The bottom of the sleeve is inclined in two spirals 15 and 16 complementary and conforming to the inclined surfaces 12 and 13 on the casting 10, with the ends of the inclines so arranged that upon the opening of the door the sleeve 14 will ride up on the inclined surfaces 12 and 13 and when the door engages the shoulder 8 the sleeve will drop down with the shoulder 17 between the inclined surfaces 15 and 16 in contact with the shoulder 18 between the inclined surfaces 12 and 13. Since the sleeve may slide vertically but not rotate on the pin 9 the door will be locked against the shoulder 8. The hinge member on the door (10) is positioned in a higher horizontal plane than the hinge member (7) on the door frame so that the blow of the opening door is taken by the lower hinge member (7) through its integral flange 8, therefore, this blow is in no way resisted by the pin 9. Such resistance might distort the pin 9 and cause the door to be inoperative.

The pin 9 above the uppermost portion of the sleeve 14 is rounded again and a lock washer 19 is secured thereon by a cotter or holder 20 to prevent the displacement of the sleeve. The sleeve is provided with a protruding finger clip 21 whereby the sleeve may be lifted when the door is in open locked position so that the shoulders 17 and 18 are out of engagement and the door closed.

The advantage of this arrangement is readily seen as the doors being positively held in their open position prevent damage to the freight being loaded or unloaded as they cannot swing inward and strike the passing lading nor can they swing outward and strike a train passing on an adjacent track.

What I claim is:

1. A door stop for end door automobile freight cars comprising hinge members on the door and door frame positioned in different horizontal planes rotatable on a hinge pin carried by one member in line with the door hinges, and a member on the door frame hinge member adapted to be engaged by the door and limit its outward movement, and means upon the hinge pin for engaging the door hinge member in its outermost position to lock the door to the door frame member when the door engages that member, said means comprising a sleeve vertically and non-rotatably mounted on the hinge pin having a shoulder thereon and a stationary shoulder on the door frame member adapted to be engaged thereby in the open position of the door to prevent the closing of the door.

2. A door stop for end door automobile freight cars comprising hinge members on the door and door frame positioned in different horizontal planes rotatable on a hinge pin carried by one member in line with the door hinges, and a member on the door frame hinge member adapted to be engaged by the door and limit its outward movement, and means upon the hinge pin for engaging the door hinge member in its outermost position to lock the door to the door frame member when the door engages that member, said means comprising a sleeve vertically and non-rotatably mounted on the hinge pin having a shoulder thereon and a stationary shoulder on the door frame member adapted to be engaged thereby in the open position of the door to prevent the closing of the door, and a finger clip on the sleeve for lifting the sleeve clear of the stationary shoulder to allow the door to be closed.

CHARLES HARTER.